United States Patent Office 3,493,563
Patented Feb. 3, 1970

---

3,493,563
PROCESS FOR THE PRODUCTION OF INTERMEDIATES FOR TRIAMCINOLONE AND RELATED COMPOUNDS
Patrick A. Diassi, Westfield, N.J., assignor to E. R. Squibb & Sons, Inc., New York, N.Y., a corporation of Delaware
No Drawing. Filed Feb. 23, 1968, Ser. No. 707,463
Int. Cl. C07c 167/14, 169/34, 173/00
U.S. Cl. 260—239.55       6 Claims

---

ABSTRACT OF THE DISCLOSURE

This invention relates to a new process for the production of 21-hydroxypregna-4,9(11),16-triene-3,20-dione, 6α - fluoro - 21 - hydroxypregna-4,9(11),16-triene-3,20-dione and esters thereof, and to novel intermediates produced in the process. These steroids are useful for the production of triamcinolone and fluorinated and other derivatives of triamcinolone, compounds known primarily for their value as anti-inflammatory agents.

---

SUMMARY OF THE INVENTION

This invention relates to an improved multistep process for the production of intermediates useful in the production of triamcinolone and its fluorinated derivatives, known compounds which are primarily of use because of their anti-inflammatory action, which comprises utilizing readily available starting materials such as 9(11)-dehydrocortexolone, 6α-fluoro - 9(11)-dehydrocortexolone and especially their 21-esters such as the acetates and converting them by a sequence of high yielding steps to 21-hydroxypregna - 4,9(11),16-triene-3,20-dione or 6α-fluoro - 21 - hydroxypregna - 4,9(11),16-triene-3,20-dione, respectively.

This process comprises forming the 3-alkylene ketal of a compound of the formula (I)
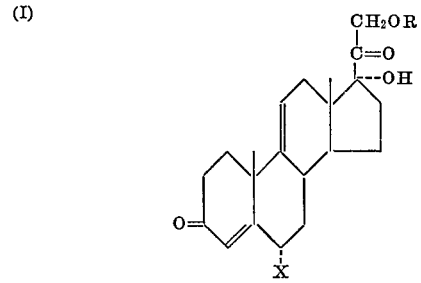

wherein X is hydrogen or fluorine and R is hydrogen or the acyl group of a hydrocarbon carboxylic acid of less than ten carbon atoms, by reacting the compound of Formula I with a ketalizing agent such as an alkylene glycol like ethylene glycol or the like, preferably in an inert organic solvent such as benzene, toluene or xylene.

Preferably, R in Formula I is an acyl group so that if R is hydrogen in the starting substance, the 21-ester is formed by reaction with an esterifying acid.

The ketalized product having the formula (II)
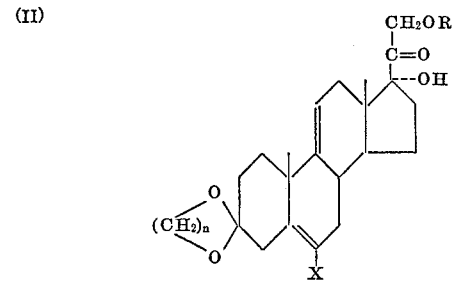

wherein X and R have the same meaning as in Formula I and n is an integer from 1 to 4, is converted to a compound of the formula (III)
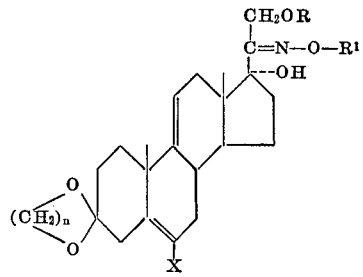

wherein $R^1$ is a lower alkyl group such as methyl, ethyl, etc. and the other symbols are the same as above, by reaction with an alkoxyamine, preferably a salt thereof, e.g., a lower alkoxyamine such as methoxyamine hydrochloride in an organic base such as pyridine, piperidine or morpholine with or without an inert organic solvent such as ether.

The 17α-hydroxy group of the compound of Formula III is then eliminated and a double bond is introduced into the 16,17-position by treating with a dehydrating agent such as thionyl chloride or phosphorous oxychloride or the like in an organic base such as pyridine, or the like, resulting in a compound of the formula (IV)
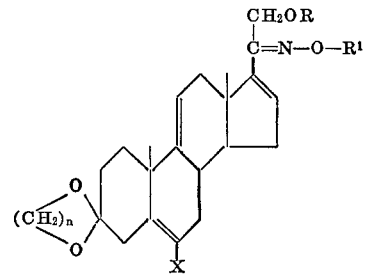

The compound of Formula IV is then converted to a compound of the formula (V)
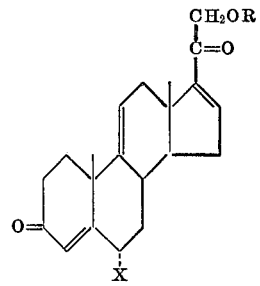

by treatment with an inorganic acid such as a hydrohalic acid like hydrochloric acid, sulfuric acid or an organic acid such as an alkanoic acid like acetic acid.

The compound of Formula V, when X=R=H may then be converted to triamcinolone by the procedure described in the Journal of the American Chemical Society, 81, 1689 (1959).

Similarly when X is fluorine in Formula V, the 6-fluoro derivatives of triamcinolone may be obtained by the same sequence of steps.

In all of the foregoing structural formulas, X represents hydrogen or fluorine. R represents the acyl radical of hydrocarbon carboxylic acids such as acetic, propionic, butyric, and the like.

Starting materials of Formula I include, for example, 9(11)-dehydrocortexolone and its 21-acetate, 6α-fluoro-9(11)-dehydrocortexolone and its 21-acetate, etc.

This improved process to triamcinolone and 6α-fluorotriamcinolone offers a route to these compounds via readily available intermediates such as 9(11)-dehydrocortexolone 21-acetate and 6α-fluoro-9(11)-dehydrocortexolone 21-acetate.

Thus, improved yields are obtained of compounds such as triamcinolone, 6α-fluorotriamcinolone, and the like.

The following examples are illustrative. All temperatures are on the centigrade scale.

EXAMPLE 1

3-ethylenedioxy-17α,21-dihydroxypregna-5,9(11)-diene-3,20-dione 21-acetate

A solution of 2.0 g. of 9(11)-dehydrocortexolone 21-acetate in 250 ml. of benzene is distilled until 70 ml. of distillate is collected. Forty ml. of ethylene glycol and 25 mg. of p-toluene-sulfonic acid are then added and the reaction mixture refluxed for 20 hours utilizing a Dean-Stark separator to remove water. The mixture is cooled, neutralized with dilute sodium carbonate, diluted with 200 ml. of water and extracted with chloroform. The chloroform is separated, washed with water and evaporated under reduced pressure. Crystallization of the residue from acetone-hexane gives 1.41 g. of 3-ethylenedioxy-17α,21-dihydroxypregna-5,9(11)-diene-3,20-dione 21-acetate having an M.P. about 245–248° C.; $[\alpha]_D^{25}$ +41° (chloroform);

$\tau_{CDCl_3}^{SiMe_4}$ 9.34 (s., 18-$CH_3$), 8.79 (s., 19-$CH_3$), 7.80 (s., 21-OAc), 6.05 (s., 3-O—$CH_2$—$CH_2$—O), 4.52 (m., 6-H), 4.40 (m., 11-H).

Analysis.—Calcd. for $C_{25}H_{34}O_6$ (430.52): C, 69.74; H, 7.96. Found: C, 69.54; H, 8.02.

EXAMPLE 2

6-fluoro-3-ethylenedioxy-17α,21-dihydroxypregna-5,9(11)-diene-20-one 21-acetate

Following the procedure of Example 1 but substituting 6α-fluoro-9(11)-dehydrocortexolone 21-acetate for the 9(11)-dehydrocortexolone 21-acetate there is obtained 6-fluoro-3-ethylenedioxy-17α,21-dihydroxypregna-5,9(11)-diene-20-one 21-acetate.

EXAMPLE 3

3-ethylenedioxy-20-methoximinopregna-5,9(11)-diene-17α,21-diol 21-acetate

To a solution of 865.5 mg. of 3-ethylenedioxy-17α,21-dihydroxypregna-5,9(11)-diene-20-one 21-acetate in 16 ml. of dry pyridine is added a solution of 870 mg. of methoxylamine hydrochloride and 9 ml. of dry pyridine and the mixture is stirred at room temperature for 3.5 days until it no longer gives a positive tetrazolium reaction. The solution is then evaporated under reduced pressure nearly to dryness then diluted with 100 ml. of water and extracted with chloroform. The chloroform is washed with water and evaporated under reduced pressure. Crystallization of the residue from acetone-hexane containing a drop of pyridine gives 746 mg. of 3-ethylenedioxy-20-methoximinopregna-5,9(11)-diene-17α,21-diol 21-acetate having an M.P. about 140–145° C.; $[\alpha]_D^{25}$ +0.9° (chloroform);

$\tau_{CDCl_3}^{SiMe_4}$ 9.35 (s., 18-$CH_3$), 8.77 (s. 19-$CH_3$), 7.92 (s. 21-OAc), 6.10 (s., $OCH_3$), 6.05 (s., O—CH—CH—O), 4.55 (m., 6-H), 4.48 (m., 11-H)

Analysis.—Calcd. for $C_{26}H_{37}O_6N$ (459.56): C, 67.95; H, 8.12; N, 3.05. Found: C, 68.05; H, 8.16; N, 3.20.

EXAMPLE 4

3-ethylenedioxy-6-fluoro-20-methoximinopregna-5,9(11)-diene-17α,21-diol 21-acetate Following the procedure of Example 3 but substituting 3-ethylenedioxy-6-fluoro-17α,21-dihydroxypregna-5,9(11)-diene-20-one 21-acetate for the 3-ethylenedioxy-17α,21-dihydroxypregna-5,9(11)-diene-20-one 21-acetate there is obtained 3-ethylenedioxy-6 fluoro-20-methoximinopregna-5,9(11)-diene-17α,21-diol 21-acetate.

EXAMPLE 5

3-ethylenedioxy-20-methoximinopregna-5,9(11),16-triene-21-ol 21-acetate

At —40° C. to a solution of 200 mg. of 3-ethylenedioxy-20-methoximinopregna-5,9(11)-diene-17α,21-diol 21-acetate in 2 ml. of dry pyridine is quickly added 2.0 ml. of a solution containing 0.4 ml. of thionyl chloride in 10 ml. of dry pyridine and the mixture is stirred at —40° for 1 hour. The reaction mixture is then poured on ice, diluted with water and filtered to give 178 mg. of 3-ethylenedioxy-20-methoximino-pregna-5,9(11), 16-triene-21-ol 21-acetate having an M.P. 150–152° C.; $[\alpha]_D^{25}$ —64° (chloroform);

$\lambda_{max}^{alc.}$ 248 mμ (ε 11,700) $\tau_{CDCl_3}^{SiMe_4}$ 9.06 (s., 18-$CH_3$), 8.77 (s., 19-$CH_3$), 7.93 (s., OAc), 6.06 (s., O—$CH_3$ and O—$CH_2$—$CH_2$—O), 5.10 (s., 21-$CH_2$—O), 4.06 (m., 6-H), 4.05 (s., 11-H), 3.89 (m., 16-H).

Analysis.—Calcd. for $C_{26}H_{35}O_5N$ (441.55): C, 70.71; H, 7.99; N, 3.17. Found: C, 70.64; H, 8.00; N, 3.30.

EXAMPLE 6

3-ethylenedioxy-6-fluoro-21-methoximinopregna-5,9(11),16-triene-21-ol 21-acetate Following the procedure of Example 5 but substituting 3-ethylenedioxy-6-fluoro-20-methoximinopregna-5,9(11)-diene-17α,21-diol 21-acetate for 3-ethylenedioxy-20-methoximinopregna-5,9(11)-diene-17α,21-diol 21-acetate there is obtained 3-ethylenedioxy-6-fluoro-20-methoximinopregna-5,9(11)16-triene-21-ol 21-acetate.

EXAMPLE 7

21-hydroxypregna-4,9-(11),16-triene-3,20-dione

A solution of 100 mg. of 3-ethylenedioxy-20-methoximinopregna-5,9(11),16-triene-21-ol 21-acetate in a mixture of 3 ml. of acetone and 3 ml. of 2 N hydrochloric acid is stirred under nitrogen for 3 days. It is then neutralized with 3% sodium bicarbonate and slowly diluted with water, whereupon, crystals separate. These crystals are filtered, washed with water and dried to give 46 mg. of 21-hydroxypregna-4,9(11),16-triene-3,20-dione having an M.P. 210–212° C.

EXAMPLE 8

6α-fluoro-21-hydroxypregna-4,9(11),16-triene-3,20-dione

Following the procedure of Example 7 but substituting 3-ethylenedioxy-6-fluoro-20-methoximinopregna-5,9-(11),16-triene-21-ol 21-acetate for the 3-ethylenedioxy-20-methoximinopregna-5,9(11),16-triene-21-ol 21-acetate there is obtained 6α-fluoro-21-hydroxypregna-4,9(11),16-triene-3,20-dione.

EXAMPLE 9

6α-fluoro-21-hydroxypregna-4,9(11),16-triene-3,20-dione 21-acetate

A solution of 100 mg. of 6α-fluoro-21-hydroxypregna-4,9(11),16-triene-3,20-dione in 1.5 ml. of dry pyridine and 0.5 ml. of acetic anhydride is kept at room temperature for 16 hours. It is then diluted with water and extracted with chloroform. The chloroform extract is washed successively with 2 N hydrochloric acid, 5% sodium bicarbonate and water and evaporataed to dryness under reduced pressure. Crystals of the residue from acetone-hexane give 6α-fluoro-21-hydroxypregna-4,9(11),16-triene-3,20-dione 21-acetate.

EXAMPLE 10

6α-fluoro-16α,17α,21-trihydroxypregna-4,9(11)-diene-3,20-dione 21-acetate

To a solution of 473 mg. of 6α-fluoro-21-hydroxypregna-4,9(11),16-triene-3,20-dione 21-acetate in a mixture of 15 ml. acetone and 1.2 ml. of 10% formic acid at −20° C. is added dropwise with stirring to 13 ml. of a solution containing 630 mg. of potassium permanganate in a mixture of 9 ml. of water and 2 ml. of acetone. The resulting mixture is treated with a few ml. of 5% sodium sulfite to decompose any excess permanganate then filtered and washed well with acetone. The filtrate is evaporated nearly to dryness then diluted with water and extracted with chloroform. The chloroform is washed well with water and evaporated. Crystallization of the residue from methanol gives 397 mg. of 6α-fluoro-16α,17α,21-trihydroxypregna-4,9(11)-diene-3,20-dione 21-acetate.

The invention may be variously otherwise embodied within the scope of the appended claims.

What is claimed is:
1. A compound of the formula

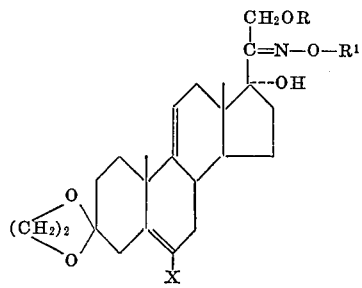

wherein X is hydrogen or fluorine, R is hydrogen or the acyl group of a hydrocarbon carboxylic acid of less than ten carbon atoms and $R^1$ is lower alkyl.

2. A compound as in claim 1 wherein X is hydrogen, R is acetyl, and $R^1$ is methyl.

3. A compound as in claim 1 wherein X is fluorine, R is acetyl, and $R^1$ is methyl.

4. A compound of the formula

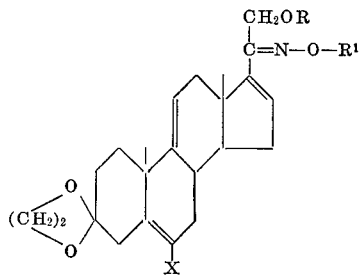

wherein X, R and $R^1$ are as defined in claim 1.

5. A compound as in claim 4 wherein X is hydrogen, R is acetyl, and $R^1$ is methyl.

6. A compound as in claim 4 wherein X is fluorine, R is acetyl, and $R^1$ is methyl.

References Cited

UNITED STATES PATENTS

| | | | |
|---|---|---|---|
| 3,004,995 | 10/1961 | Long et al. | 260—397.45 |
| 3,165,541 | 1/1965 | Hydorn et al. | 260—397.4 |

LEWIS GOTTS, Primary Examiner

ETHEL G. LOVE, Assistant Examiner

U.S. Cl. X.R.

260—397.45